United States Patent
Germain et al.

(10) Patent No.: US 7,183,527 B2
(45) Date of Patent: Feb. 27, 2007

(54) INSTALLATION FOR MICROWAVE HEATING OF A PRODUCT HELD IN CONTAINERS

(75) Inventors: Alain Germain, Bourg la Reine (FR); Andre-Jean Berteaud, Le Kremlin Bicetre (FR); Mostafa El Haba, Corbeil Essonnes (FR); Patrick Mahe, Ormesson sur Marne (FR)

(73) Assignee: M.E.S. Technologies, Villejuif (FR)

( * ) Notice: Subject to any disclaimer, the term of this patent is extended or adjusted under 35 U.S.C. 154(b) by 0 days.

(21) Appl. No.: 10/513,571

(22) PCT Filed: Apr. 23, 2003

(86) PCT No.: PCT/FR03/01279

§ 371 (c)(1),
(2), (4) Date: Feb. 23, 2005

(87) PCT Pub. No.: WO03/092331

PCT Pub. Date: Nov. 6, 2003

(65) Prior Publication Data

US 2005/0115963 A1 Jun. 2, 2005

(30) Foreign Application Priority Data

Apr. 24, 2002 (FR) .................................. 02 05119

(51) Int. Cl.
*H05B 6/78* (2006.01)
*B65D 81/34* (2006.01)
*A23L 3/00* (2006.01)

(52) U.S. Cl. ...................... 219/701; 219/728; 219/729; 219/730; 219/734; 219/762; 426/234; 426/243; 99/DIG. 14

(58) Field of Classification Search ........ 219/698–701, 219/725–735, 762–763; 426/107, 234, 241, 426/243; 99/DIG. 14, 443 C, 451
See application file for complete search history.

(56) References Cited

U.S. PATENT DOCUMENTS

| 2,809,743 | A |   | 10/1957 | Hinchcliffe |
| 3,974,353 | A |   | 8/1976 | Goltsos |
| 4,965,424 | A | * | 10/1990 | Bagley ........................ 219/730 |
| 5,160,819 | A | * | 11/1992 | Ball et al. .................... 219/700 |
| 5,416,304 | A | * | 5/1995 | De La Cruz et al. ....... 219/730 |
| 6,852,958 | B2 | * | 2/2005 | Germain et al. ............ 219/700 |

FOREIGN PATENT DOCUMENTS

| EP | 0 350 564 | * | 1/1990 |
| FR | 1 395 630 |   | 4/1965 |
| WO | WO 02/18231 A2 | * | 3/2002 |

* cited by examiner

*Primary Examiner*—Philip H. Leung
(74) *Attorney, Agent, or Firm*—Merchant & Gould P.C.

(57) ABSTRACT

The installation includes a microwave heater station (14) having a microwave applicator, and a support (10) suitable for supporting the receptacles (12) in the heater station. The support (10) has at least one receptacle zone (20) which is defined by the surface (10A) of the support and by a metal band (24A, 24B) fixed to the support. The zone (20) serves to support a receptacle (12) whose bottom stands on the surface (10A) of the support and whose side wall (12B) is surrounded by the band. The support can be a conveyor bringing the receptacles into the heater station.

24 Claims, 2 Drawing Sheets

INSTALLATION FOR MICROWAVE HEATING OF A PRODUCT HELD IN CONTAINERS

BACKGROUND OF THE INVENTION

The invention relates to an installation for heating a substance contained in receptacles by applying microwaves thereto, the installation comprising a microwave heater station having microwave application means, and a support suitable for supporting the receptacles in the heater station.

It is known from Patent Application PCT/FR01/02698 that, in order to ensure that a substance contained in receptacles is heated uniformly, it is advantageous to provide an end wall (the bottom or the lid) of each of the receptacles with an uninterrupted extra thickness of dielectric material, and to limit the extent to which microwaves pass through the side wall of each of the receptacles by providing said side wall with an electrically conductive material that reflects microwaves.

Heating by applying microwaves concerns domestic applications, for heating up or for defrosting (thawing) food. It also concerns industrial applications, in which microwaves are used for pasteurizing or sterilizing a substance, in particular food, contained in a receptacle.

The above-mentioned patent application proposes for the receptacle to be formed by a tray directly containing the substance to be heated by the microwaves. The receptacle can also be a utensil in which a tray containing such a substance can be disposed for heating said substance in a microwave oven, e.g. a domestic microwave oven. That patent application also proposes disposing a utensil of that type on the conveyor of a microwave heating installation, the utensil serving to receive trays containing a substance to be heated by applying microwaves thereto in that installation, in particular for pasteurizing and sterilizing the substance.

Such a known installation operates quite satisfactorily, but at a cost that is relatively high. A large number of utensils must be disposed on the conveyor in order for the installation to operate at an industrial rate of throughput.

Unfortunately, the cost of each utensil is relatively high. The extra thicknesses are disposed on the bottoms of the utensils, and the trays of substance that are to be disposed in those utensils must have their bottoms provided with cavities suitable for receiving said extra thicknesses.

The installation serves to pasteurize or sterilize the substance contained in the trays, but, prior to being consumed, said substance must generally be heated up again by the consumer in a domestic microwave oven. Since the trays must be shaped as indicated above in order to fit the specific shape of the utensils on the conveyor, it is difficult to provide the trays with means enabling the distribution of the microwaves to be made uniform during said heating in a domestic microwave oven.

Thus, with an installation of the type known from the prior art, the substance contained in the trays can be satisfactorily sterilized and pasteurized, but that generates a relatively large extra cost for the installation, and prevents the trays from offering the possibility of being heated uniformly in preparation for consumption of the substance, so that the consumer always finds zones that are cold or zones that are too hot in the substance contained in the trays.

BRIEF SUMMARY OF THE INVENTION

An object of the present invention is to remedy those drawbacks, or at least to mitigate them.

In an installation of the invention, the heater station may be the cavity of a microwave oven, the support then being the bottom of the cavity or a shelf placed therein.

For example, the installation may be applied to an automatic dispenser of pre-cooked dishes that are heated in said dispenser.

The dispenser may have a dish storage portion (optionally refrigerated), means for transferring the dishes from the storage portion to the heater station, and means for removing the dishes, the various means being actuated in response to the consumer making an order (payment) and a selection.

An object of the invention is to provide an installation that makes it possible, inexpensively, to heat uniformly the substance contained in the receptacles, without requiring costly utensils to be formed and put in place in the heater station.

This object is achieved by the fact that the support has at least one receptacle zone which is defined by the surface of said support and by a metal band held on the support, said zone serving to support a receptacle whose bottom is placed on the surface of the support and whose side wall is surrounded by the band.

By means of these provisions, the support has a configuration that is extremely simple because a simple metal band is fixed to the support. The inside shape of said band can easily be designed such that it matches conventional trays. In particular, it is not necessary for the bottom of each of the trays to be provided with a cavity. The metal band is, in itself, an element that is inexpensive, that is optionally made of a single material, and that is easy to fix to the support. The band limits, or even prevents, the penetration of microwaves into the receptacles, via the side walls of said receptacles. However, the microwaves can penetrate freely into the receptacles via their top and bottom faces.

Advantageously, the support is a conveyor which is suitable for bringing the receptacles into the heater station, and the conveyor has receptacle zones, each of which is defined by the surface of the conveyor and by a metal band fixed to the conveyor, each zone serving to support a receptacle whose bottom is placed on the surface of the conveyor and whose side wall is surrounded by the band.

Advantageously, the conveyor is made up of at least two elements which remain substantially stationary relative to each other, over the path that they travel between the inlet and the outlet of the heater station, and which move relative to one another outside said path, and at least one band is a hinged band which comprises two band portions secured to respective ones of each of said elements.

For example, the conveyor is a conveyor belt made up of a plurality of slats, and each band is made up of two portions, each of which is secured to a respective one of two different slats of the conveyor.

For example, the two elements of the conveyor that are mounted to move relative to each other (the slats of the conveyor belt) are made of a plastics material such as polypropylene. Each of the various portions of the band in question is fixed to a respective one of the elements of the conveyor. Thus, the elements can move relative to each other without hindrance, but the portions of the band are disposed such that, when the elements of the conveyor take up the relative position that they occupy in the heater station, the portions of the band, as considered together, form a metal band suitable for surrounding the side wall of a receptacle disposed in the receptacle zone defined by the band.

The invention also relates to an assembly made up of an installation of the invention, and of receptacles serving to contain the substance that is to be heated by microwaves in said installation.

According to the invention, each of the receptacles has an end wall, namely a bottom or a lid, which has extra thickness formed of a dielectric material.

With the invention, it is the receptacles that can have the extra thickness of dielectric material, while the bands made of microwave-reflecting material are disposed on the support. Thus, when a receptacle containing the substance to be heated (pasteurized, or sterilized) by microwaving is disposed in the receptacle zone defined by a band, heating is distributed uniformly throughout the substance contained in the receptacle because the microwaves are concentrated at the bottom of the receptacle by the dielectric extra thickness with which said bottom is provided, while said microwaves are prevented from acting against the side wall of the receptacle by the metal band.

Then, when the consumer of the substance contained in the receptacle wishes to heat the substance in order to consume it, said consumer places the receptacle (a tray) in a domestic microwave oven. During this heating stage, the extra thickness acts to concentrate the microwaves, and cold zones are avoided or at least limited in the central region of the receptacle, although to a lesser extent than with trays having both extra thickness and surrounding metal, as in Patent Application PCT/FR01/02968.

It should be noted that the power of the microwaves in a domestic oven can be lower than their power in pasteurization or sterilization installations. Thus, the overall heating time for which the substance is heated can be increased slightly when said substance is contained in a receptacle having extra thickness of a dielectric material, but the microwaves are distributed much more uniformly than with a receptacle devoid of such extra thickness, and the consumer enjoys the satisfaction of consuming a substance that is heated uniformly.

Preferably, each receptacle has a side wall which defines a periphery analogous to the inside shape of the metal band.

Advantageously, each receptacle comprises a side wall and a bottom formed integrally with each other and of the same material.

Frequently, receptacles containing a substance to be heated up by microwaves are disposable. It is desirable firstly for such receptacles to be inexpensive, and secondly for them to be easy to recycle. A receptacle whose side wall and whose bottom are formed of a single material is thus considerably less costly than the receptacle described by Patent Application PCT FR/01/02698, while also offering, when combined with the metal band of the installation, the same quality of sterilization or of pasteurization by microwaving.

The invention will be well understood and its advantages will appear more clearly on reading the following detailed description of an embodiment shown by way of non-limiting example.

DETAILED DESCRIPTION OF THE INVENTION

Figure 1:
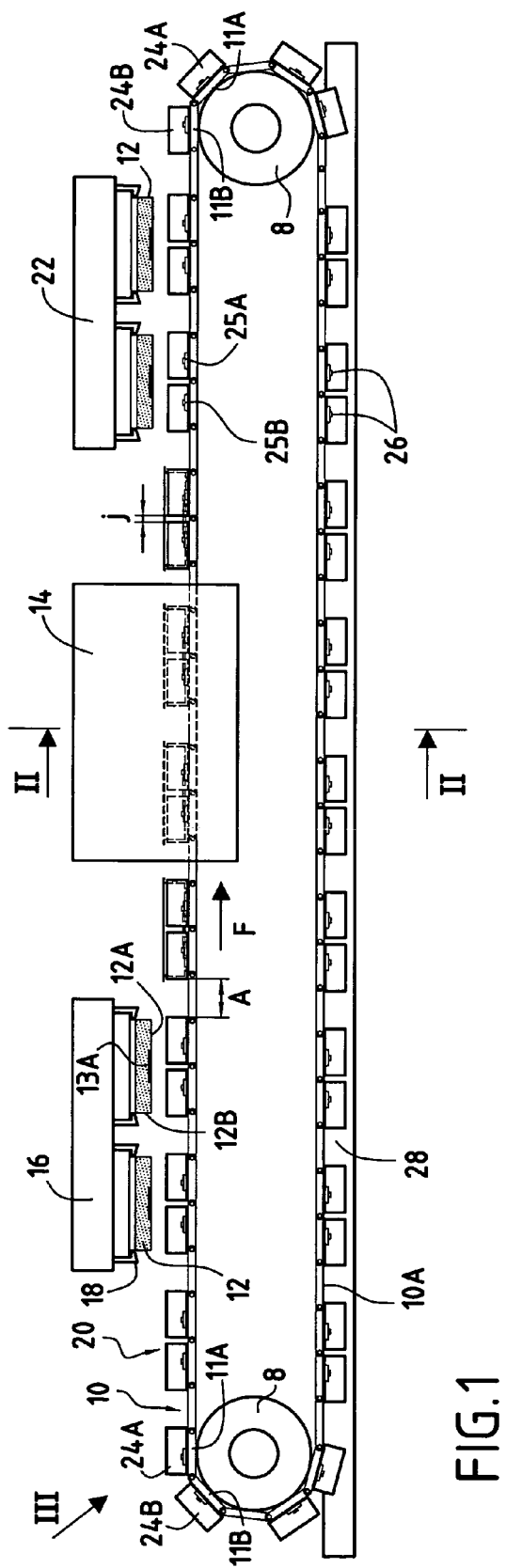
FIG. 1 is an overall side view of an installation of the invention.

The installation shown in FIG. 1 comprises a conveyor 10 on which receptacles 12 containing a substance to be treated with microwaves can be disposed, and which can convey said receptacles through a microwave heater station 14. Microwave application means of a type known per se are disposed in said station 14. It is recalled that microwaves are electromagnetic waves whose frequency lies in the range 0.3 GHz to 300 GHz, and more particularly in the range 0.3 GHz and 5.2 GHz.

Upstream from the station 14 in the advance direction F in which the conveyor advances, the installation includes a receptacle loading station 16 in which the receptacles 12 are put in place on the conveyor. For example, the loading station comprises receptacle support and deposit means 18 suitable for carrying the receptacles and for disposing them in the receptacle zones 20 of the conveyor.

In the example shown, the receptacles 12 which are put in place on the conveyor in the station 16 are already filled with substance to be subjected to microwaves, and are already closed. It is also possible to imagine the installation having means for continuously disposing empty receptacles on the conveyor, a metering and filling station for filling each of the receptacles with a metered quantity of substance that is to be subjected to microwave treatment, and a station for closing said receptacles, e.g. by sealing a peel-off strip over the top opening in each of said receptacles, the various stations being disposed upstream from the station 14. The support (conveyor) is, at least in the receptacle zones 20, devoid of elements, in particular metal elements, that prevent or limit propagation of microwaves.

Downstream from the station 14, the installation includes a station 22 for removing the receptacles 12, which station takes hold of the receptacles in the receptacle zones in order to carry them to means for packaging them and for putting them onto pallets.

The installation can also include a warming station (not shown) in which the receptacles are maintained at a temperature for a time such that the time/temperature pair complies with a desired pasteurization value.

The warming station is disposed downstream from the station 14, optionally following on from the station 22.

For example, the warming station operates with a heated fluid (air or water).

Figure 3:
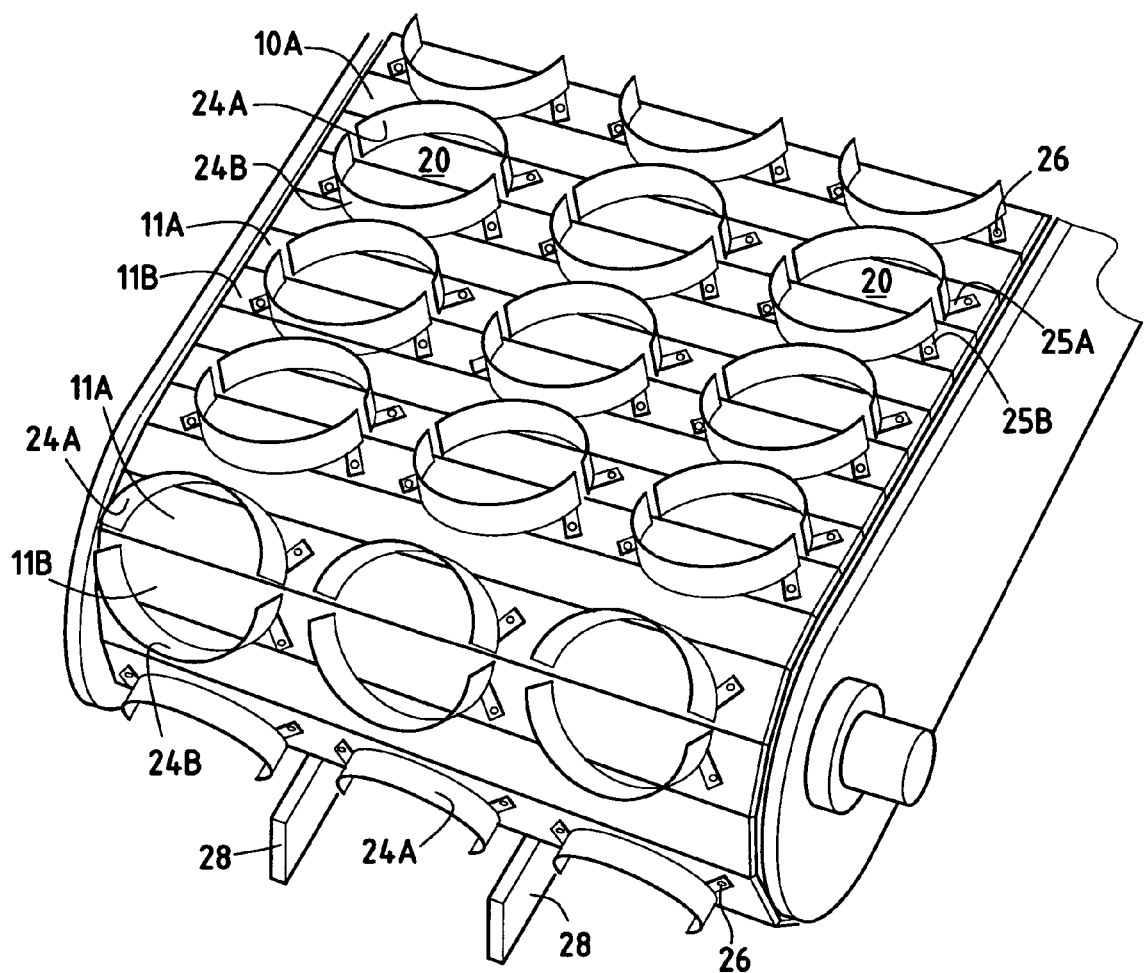
FIG. 3 is a fragmentary perspective view seen looking arrow III of FIG. 1.

As can be seen more clearly in FIG. 3, each of the receptacle zones 20 is defined by the surface 10A of the conveyor and by a metal band fixed to the conveyor. In the advantageous example shown, each metal band is made up of two half-band portions 24A and 24B. Said half-bands are fixed to the surface of the conveyor, and each zone 20 can thus support a receptacle whose bottom 12A is placed on the surface 11A of the conveyor and whose side wall 12B is surrounded by the band 24A, 24B.

The conveyor 10 is made up of a plurality of slats 11A, 11B which extend transversely to the advance direction F in which the conveyor advances, and which are fixed together in mutually hinged manner. It can be seen that, over the entire top path of the conveyor, lying between the stations 16 and 22, the various slats 11A, 11B remain stationary relative to each other. Conversely, at the ends of the conveyor, said conveyor is supported by transverse rollers 8 that enable it to go round in a loop. In the regions of the rollers 8, the conveyor must take up a small radius of curvature determined by the radius of curvature of the rollers, and the various slats that make up said conveyor angularly position themselves relative to one another accordingly.

For each band, the first half-band 24A is secured to one slat 11A of the conveyor, and the second half-band 24B is secured to another slat 11B adjacent to the first slat. Thus, as seen in FIG. 1, the band tends to open in the end regions of the conveyor because the two half-bands move apart from each other, correspondingly to the relative displacement of the slats 11A and 11B.

Outside the small radius of curvature zones, and in particular in the station 14, each of the bands forms an almost continuous band.

However, it can be observed in FIGS. 1 and 3 that, even over the path traveled by the elements of the conveyor between the stations 16 and 22 and, more precisely, between the inlet and the outlet of the heater station 14, the two half-bands 24A and 24B are disposed such that a gap j exists between them. This gap is narrow, and, for example, it lies in the range 0.5 millimeters (mm) to 3 mm, it preferably being about 1 mm.

A gap that is too wide would prevent the band locally from acting as a microwave reflector element, and could lead to considerable local heating in a region of the receptacle that is close to the gap between the two half-bands. However, since the two half-bands are mounted to move relative to each other, it would be difficult, unless they are manufactured with extremely great precision and thus at high cost, to guarantee full contact between their facing edges when they are in their "treatment" position, which is the position that they occupy in particular in the station 14. If the contact between the two half-bands is incomplete, there is a risk of electric arcs striking between the facing edges of the two half-bands that are in partial contact. Choosing a narrow gap j between the facing edges makes it possible to avoid that risk.

It can be seen in the figures that the bands are spaced apart from one another. This spacing makes it possible to prevent electric arcs from striking in the station 14 between two bands. Preferably, the spacing A in the direction F and the spacing B transversely to that direction are both at least 0.5 centimeters (cm) so as to avoid risks of interference between the waves reflected by the various bands in the heater station 14.

It could be imagined for the wall of each band to form a continuous whole, which would also prevent electric arcs from striking. In particular such a continuous band could be disposed on a conveyor not made up of elements that are mounted to move relative to one another. For example, such a conveyor could be a carousel conveyor.

Figure 2:
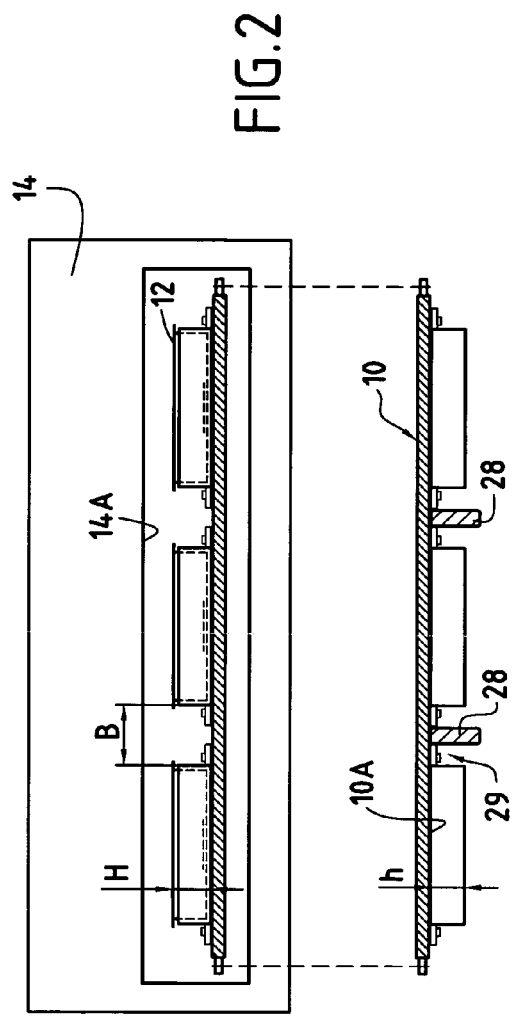
FIG. 2 is a section view seen looking along arrows II—II of FIG. 1.

However, certain carousel conveyors are also made up of elements that move relative to one another, and it should be understood that the bands made up of a plurality of portions as shown in FIGS. 1 to 3 can also be used on such conveyors.

The band portions 24A and 24B are fixed to the conveyor by fixing tabs, respectively 25A and 25B. For example they are metal tabs, formed integrally with the respective half-bands. They can be fixed by any suitable means to the surface of the conveyor, e.g. by adhesive bonding, or else by riveting. In which case, it is preferable for the rivets 26 to be made of a plastics (dielectric) material, thereby preventing electric arcs from striking in the regions in which the bands are fixed to the conveyor.

FIG. 2 shows the configuration of three bands in which receptacles are disposed at the inlet 14A of the station 14, which inlet is formed by a slot that extends transversely to the direction F.

Naturally, over the "go" path of the conveyor, between the stations 16 and 22, the outside face 10A of the conveyor on which the bands are fixed faces upwards. FIGS. 2 and 3 also show the "return" path of the conveyor on which the bands face downwards.

In order to support the conveyor over the return path, the installation includes at least one elongate support element 28. Said elongate support element extends parallel to the advance direction F in which the conveyor belt formed by the conveyor advances, is disposed under said conveyor belt, and penetrates into a space 29 provided between adjacent rows of bands so as to co-operate with the outside face 10A of the conveyor belt over the return path of said conveyor belt. In this example, two elongate support elements 28 are disposed under the conveyor and go between the fixing tabs on adjacent receptacles in the same row so as to co-operate with the face 10A of the conveyor.

Each of the receptacles 12 which are disposed in the receptacle zones of the installation has a bottom wall 12A which has extra thickness 13A of dielectric material. For example, the height of the extra thickness lies in the range 2 mm to 6 mm, the ratio between the height and the depth of the receptacle advantageously being less than 0.3, and preferably about 0.1.

For each receptacle, the extra thickness covers a portion of the bottom of the receptacle and its area is, for example, about $1/10^{th}$ to ½, and preferably about ⅓ of the area of the bottom of the receptacle.

The extra thickness is disposed in a central region of the receptacle and it is made of a dielectric material which does not reflect the microwaves, and whose dielectric constant lies in the range 1.5 to 3, and preferably greater than 2.

For example, the extra thickness may be formed in a dielectric material such as Teflon, mica, Samicanite, propylene, or glass. For example, the receptacle can be made of polypropylene or of glass, in which case the extra thickness is advantageously formed integrally with said receptacle. Advantageously, the bands 24A, 24B have a height h at least substantially equal to 80% of the height H of the side walls of the receptacles. This corresponds substantially to the level of filling of the substance inside the receptacles, and the band thus forms a "protective" band off which microwaves are reflected in order to prevent the substance contained in the receptacle from "overheating", and which is disposed against the side walls of said receptacle.

Naturally, it is advantageous for the periphery of the side wall 12B of each of the receptacles to be analogous to the inside shape of a band.

The invention claimed is:

1. An assembly comprising:
    an installation for heating a substance by applying microwaves thereto,
    removable receptacles for containing the substance to be heated by microwaves in said installation, wherein each of the receptacles has a bottom formed integrally with the receptacle and having extra thickness formed of a dielectric material, and a side wall, wherein the side wall is transparent to microwaves;
    the installation having a microwave heater station including microwave application means, and a support suitable for supporting the receptacles in the heater station, the support having at least one receptacle zone defined by the surface of said support and by a metal band secured to the support, said zone serving to support the receptacle bottom or lid placed on the surface of the support, and the band surrounding the side wall.

2. An assembly according to claim 1, wherein each receptacle side wall defines a periphery analogous to an inside shape of a band.

3. An assembly according to claim 1, wherein each receptacle side wall and bottom are formed integrally with each other and of the same material.

4. An assembly according to claim 1, wherein the band has a height at least substantially equal to 80% of the height of the side walls of the receptacles.

5. An assembly according to claim 1, wherein said extra thickness is formed in a central region of said end wall.

6. An assembly comprising:
an installation for heating a substance contained in receptacles by applying microwaves thereto;
removable receptacles for containing the substance to be heated by microwaves in said installation, wherein each of the receptacles has a bottom formed integrally with the receptacle and having extra thickness formed of a dielectric material, and a side wall transparent to microwaves;
the installation comprising a microwave heater station having microwave application means, and a conveyor for bringing the receptacles into the heater station and for supporting the receptacles in said station, the conveyor having receptacle zones, each of which is defined by a surface of the conveyor and by a metal band secured on the conveyor, each zone serving to support one of the receptacle bottoms or lids placed on the surface of the conveyor and the band surrounding the side wall.

7. An assembly according to claim 6, wherein said extra thickness is formed in a central region of said end wall.

8. An installation for heating a substance contained in receptacles by applying microwaves thereto, the installation comprising a microwave heater station having microwave application means, and a conveyor suitable for bringing the receptacles into the heater station and for supporting the receptacles in said station, the conveyor having receptacle zones, each of which is defined by a surface of the conveyor and by a metal band fixed to the conveyor, each zone serving to support a receptacle having a bottom placed on the surface of the conveyor and a side wall surrounded by the band; wherein the conveyor includes at least two elements which remain substantially stationary relative to each other, over a path that said elements travel between the inlet and the outlet of the heater station, and which move relative to one another outside said path, at least one band being a hinged band including two band portions secured to respective ones of each of said elements.

9. An installation according to claim 8, wherein the two portions of the hinged band are disposed to define a gap between them over the path traveled by the elements of the conveyor which carries them between the inlet and the outlet of the heater station.

10. An installation according to claim 9, wherein the gap lies in the range 0.5 mm to 3 mm.

11. An installation according to claim 10, wherein the gap is substantially equal to 1 mm.

12. An installation according to claim 8, wherein the conveyor is a conveyor belt comprising a plurality of slats, and each band comprises two portions, each of which is secured to a respective one of two different slats of the conveyor.

13. An installation according to claim 12, wherein the conveyor belt is driven along a go path over which the bands face upwards, and along a return path over which the bands face downwards, the installation including at least one elongate support element which extends parallel to an advance direction in which the conveyor belt advances, which is disposed under the conveyor belt, and which penetrates into a space provided between adjacent rows of bands in order to co-operate with the outside face of the conveyor belt over the return path of said conveyor belt.

14. An installation according to claim 8, wherein the bands are spaced apart from one another.

15. An installation according to claim 8, having several bands of which the walls form a continuous whole.

16. An assembly comprising the installation according to claim 15, and receptacles serving to contain the substance that is to be heated by microwaves in said installation, wherein each of the receptacles has an end wall comprising a bottom or a lid, which has extra thickness formed of a dielectric material.

17. An assembly according to claim 16, wherein each receptacle has a side wall defining a periphery analogous to an inside shape of a band.

18. An assembly according to claim 16, wherein each receptacle comprises a side wall and a bottom formed integrally with each other and of the same material.

19. An assembly according to claim 16, wherein the band has a height at least substantially equal to 80% of the height of the side walls of the receptacles.

20. A process for heating a substance, comprising:
providing an installation having a microwave heater station including microwave application means, and a support suitable for supporting receptacles in the heater station, the support having at least one receptacle zone defined by the surface of said support and by a metal band secured on the support configured for supporting a receptacle, said zone serving to support a receptacle bottom placed on the surface of the support;
providing a removable receptacle containing the substance to be heated by microwaves in said installation, wherein the receptacle has a bottom formed integrally with the receptacle having extra thickness in a central portion formed of a dielectric material, and a side wall transparent to microwaves;
placing the receptacle containing the substance in the receptacle zone of the microwave heater station; and
applying microwaves to the substance in the receptacle.

21. An assembly comprising:
an installation for heating a substance by applying microwaves thereto,
removable receptacles for containing the substance to be heated by microwaves in said installation, wherein each of the receptacles is removable and includes means for concentrating the microwaves and formed integrally with a bottom of the receptacle, and wherein the bottom comprises an extra thickness formed of a dielectric material, and a side wall transparent to microwaves;
the installation having a microwave heater station including microwave application means, and a support suitable for supporting the receptacles in the heater station, the support having at least one receptacle zone defined by the surface of said support and by means for reflecting microwaves secured to the support, wherein said means for reflecting microwaves comprise a metal band, said zone serving to support the receptacle bottom or lid placed on the surface of the support, and the band surrounding the side wall.

22. An assembly according to claim 21, wherein each receptacle has a side wall defining a periphery analogous to an inside shape of a band.

23. Art assembly according to claim 21, wherein each receptacle comprises a side wall and a bottom formed integrally with each other and of the same material.

24. An assembly according to claim 21, wherein the band has a height at least substantially equal to 80% of the height of the side walls of the receptacles.

* * * * *